(12) United States Patent
Nishizaka et al.

(10) Patent No.: US 6,612,745 B2
(45) Date of Patent: Sep. 2, 2003

(54) SLIDE BEARING DEVICE FOR ROLL IMMERSED IN CONTINUOUS MOLTEN METAL PLATING BATH

(75) Inventors: Tomoaki Nishizaka, Okayama (JP); Ichiro Tanokuchi, Okayama (JP)

(73) Assignee: Kawasaki Steel Corporation, Hyogo (JP)

( * ) Notice: Subject to any disclaimer, the term of this patent is extended or adjusted under 35 U.S.C. 154(b) by 15 days.

(21) Appl. No.: 09/959,966

(22) PCT Filed: Mar. 1, 2001

(86) PCT No.: PCT/JP01/01557

§ 371 (c)(1),
(2), (4) Date: Nov. 14, 2001

(87) PCT Pub. No.: WO01/68931

PCT Pub. Date: Sep. 20, 2001

(65) Prior Publication Data

US 2002/0181812 A1 Dec. 5, 2002

(30) Foreign Application Priority Data

Mar. 14, 2000 (JP) ........................................ 2000-069964

(51) Int. Cl.⁷ ................................................ F16C 33/24
(52) U.S. Cl. ..................... 384/297; 384/276; 384/907.1
(58) Field of Search ................................ 384/276, 281, 384/295, 297, 907, 907.1

(56) References Cited

U.S. PATENT DOCUMENTS

| 5,072,689 | A | * | 12/1991 | Nakagawa et al. | 384/283 |
| 5,571,327 | A | * | 11/1996 | Ookouchi et al. | 384/911 |
| 5,667,310 | A | * | 9/1997 | Oyagi et al. | 384/137 |
| 5,711,613 | A | * | 1/1998 | Ookouchi et al. | 384/283 |
| 5,718,519 | A | * | 2/1998 | Ookouchi et al. | 384/569 |

FOREIGN PATENT DOCUMENTS

| JP | 4-124254 | 4/1992 |
| JP | 5-44002 | 2/1993 |
| JP | 5-69155 | 9/1993 |
| JP | 5-5414 | 2/1994 |
| JP | 6-306560 | 11/1994 |
| JP | 10-317119 | 12/1998 |
| JP | 11-256300 | 9/1999 |

* cited by examiner

*Primary Examiner*—Thomas R. Hannon
(74) *Attorney, Agent, or Firm*—Young & Thompson

(57) ABSTRACT

In a sliding bearing device for continuous molten metal plating bath rolls, a shaft and a bearing composed of a sliding and contacting hard ceramic sinter are retained displaceably by a steel retainer, and by using such bearing device, therefore, a stable operation of continuous molten metal plating is achieved.

11 Claims, 2 Drawing Sheets

SLIDE BEARING DEVICE FOR ROLL IMMERSED IN CONTINUOUS MOLTEN METAL PLATING BATH

TECHNICAL FIELD

The present invention relates to a sliding bearing device for continuous molten metal plating bath rolls.

BACKGROUND ART

Continuous molten metal plating of metal band is generally operated in a process as shown in FIG. 3. A metal strip, for example, a steel strip 1 is guided into a plating cell 3 from a annealing furnace not shown through a snout 2, and is inverted in an upward direction by bath sink rolls 4, and is straightened by bath support rolls 5, and leaves the plating cell. By wiping nozzles 6, further, the deposit amount of plating metal such as zinc is adjusted to a specified value. To make the deposit amount uniform, it is important to stabilize the pass line of the metal strip 1 at the wiping point, and the pass line is stabilized by the bath support rolls 5 and upper support rolls 7. The metal strip 1 is then sent into an alloying furnace 8 of a next step.

Bearings used in the sink rolls 4 and bath support rolls 5 are sliding bearings of bush structure in most cases, and the bearing material is metal such as stainless steel or the like, metal+WC sprayed layer, carbon, and others, and gradual wear during operation causes various problems, such as variation of pass line, vibration of roll and shortening of roll replacement interval. Besides, since the worn bearing cannot be used again, the repair cost becomes high.

To solve these problems, hitherto, various techniques have been proposed: for example, as disclosed in Japanese Patent Application Laid-open No. 10-317119, a glass ceramic layer is disposed on the surface of the bearing, and a groove is formed in the thrust surface of the bush side to lower the abrasion coefficient of the bearing, or as disclosed in Japanese Patent Application Laid-open No. 11-256300, a partial cylindrical hard ceramic sinter is used as the bearing material, and a boron nitride application layer is disposed between it and a steel retainer so as to be used for a long period. Besides, Japanese Patent Application Laid-open No. 4-124254, Japanese Patent Application Laid-open No. 5-44002, Japanese Laid-open Utility Model No. 5-69155, and Japanese Patent Application Laid-open No. 6-306560 disclose a bearing structure of fitting metal retainer and ceramic directly, and in particular Japanese Patent Application Laid-open No. 6-306560 proposes a semi-cylindrical or partial cylindrical ceramic, in which the angle of two straight lines linking the center of rotation of the shaft and both ends in the peripheral direction of the inside of the ceramic is 20 to 90 degrees.

These prior arts, however, have the following problems.

(1) When the temperature is changed several times by lifting and dipping the rolls repeatedly, in the case of ceramic bearing material, in a structure of steel retainer filled with cylindrical ceramic, the difference of thermal expansion between steel and ceramic is large, and a compressive force is applied to the ceramic by the residual zinc between the steel retainer and the cylindrical ceramic in the shrinking process, and finally the cylindrical ceramic is broken.

(2) In the bearing structure disclosed in Japanese Patent Application Laid-open No. 10-317119, the glass ceramic layer may be peeled by thermal stress, and the glass ceramic layer must be coated again, thereby increasing the repair cost.

(3) In the bearing structure disclosed in Japanese Patent Application Laid-open No. 11-256300, it takes much time and labor in maintenance, and moreover if zinc invades into the gap, its compressive force may lead to fracture.

(4) In the bearing structure disclosed in Japanese Patent Application Laid-open No. 4-124254, Japanese Patent Application Laid-open No. 5-44002, or Japanese Laid-open Utility Model No. 5-69155, zinc invades into the gap, or the ceramic may be broken by thermal stress, and countermeasures are not sufficient.

(5) In the bearing structure disclosed in Japanese Patent Application Laid-open No. 6-306560, breakage of ceramic can be prevented, but the shaft is likely to separate from the ceramic during operation, and vibration of steel band or uneven wear or the like of shaft may occur, and stable operation may not be realized.

SUMMARY OF THE INVENTION

It is hence an object of the invention to solve the problems of these prior arts, and provide a sliding bearing device for continuous molten metal plating bath rolls excellent in durability, and contributing to stable operation of continuous molten metal plating.

The solve the problems, the invention presents a sliding bearing device for continuous molten metal plating bath rolls, in which a shaft and a bearing composed of a hard ceramic sinter sliding and contacting with said shaft are retained displaceably by a steel retainer.

In the invention, the bearing rolls with its back side in contact with the inside of the retainer, and its inside is desired to be displaceable by rolling in contact with the roll shaft.

Also, according to the invention, the bearing preferably forms a partial cylindrical shape with an effective angle from over 90 degrees to 160 degrees. Preferably, the effective angle is 100 degrees to 160 degrees.

In the invention, preferably, the inside of the retainer and the back side of the bearing contact with each other by setting the radius of curvature of the former large than that of the latter. Specifically, the ratio of the radius of curvature of the inside of the retainer and the back side of the bearing is from over 1.0 to 1.5. Preferably, the ratio of the radius of curvature is from over 1.0 to 1.2.

THE PREFERRED EMBODIMENT OF THE PRESENT INVENTION

In the sliding bearing device for continuous molten metal plating bath rolls of the invention, a bearing composed of a shaft and a hard ceramic sinter sliding and contacting therewith is retained displaceably by a steel retainer.

Since the bearing material is a hard ceramic sinter small in friction coefficient with shaft and excellent in wear resistance, the bath rolls are not driven and the problem of metal band vibration is solved, and the rate of wear is slow and the period of replacement of rolls is longer, so that the repair cost is curtailed. Moreover, since the steel retainer for retaining the bearing retains the bearing displaceably, in the cooling process after lifting from the plating bath, the bearing varies in the relative positional relation with the retainer depending on the force by the residual plating metal in the bearing device gap and can avoid compressive force overload on the bearing material, so that the breakage of the hard ceramic sinter can be prevented.

Examples of hard ceramics for composing the hard ceramic sinter preferably include silicon nitride ($Si_3N_4$), sialon (a compound of Si—Al—O—N having part of atoms of silicon nitride replaced by Al and O), and $TiB_2$. The retainer is formed in a frame shape for enveloping the bearing displaceably, and the retainer material includes SUS316, SUS316L (the standard composition of JIS shown in Table 1), and any other metal having resistance to molten metal.

TABLE 1

| Sort of Steel | C | Si | Mn | P | S | Ni | Cr | (mass %) Mo |
|---|---|---|---|---|---|---|---|---|
| SUS316 | 0.08 or less | 1.00 or less | 2.00 or less | 0.045 or less | 0.030 or less | 10.00–14.00 | 16.00–18.00 | 2.00–3.00 |
| SUS316L | 0.030 or less | 1.00 or less | 2.00 or less | 0.045 or less | 0.030 or less | 12.00–15.00 | 16.00–18.00 | 2.00-3.00 |

Figure 1:
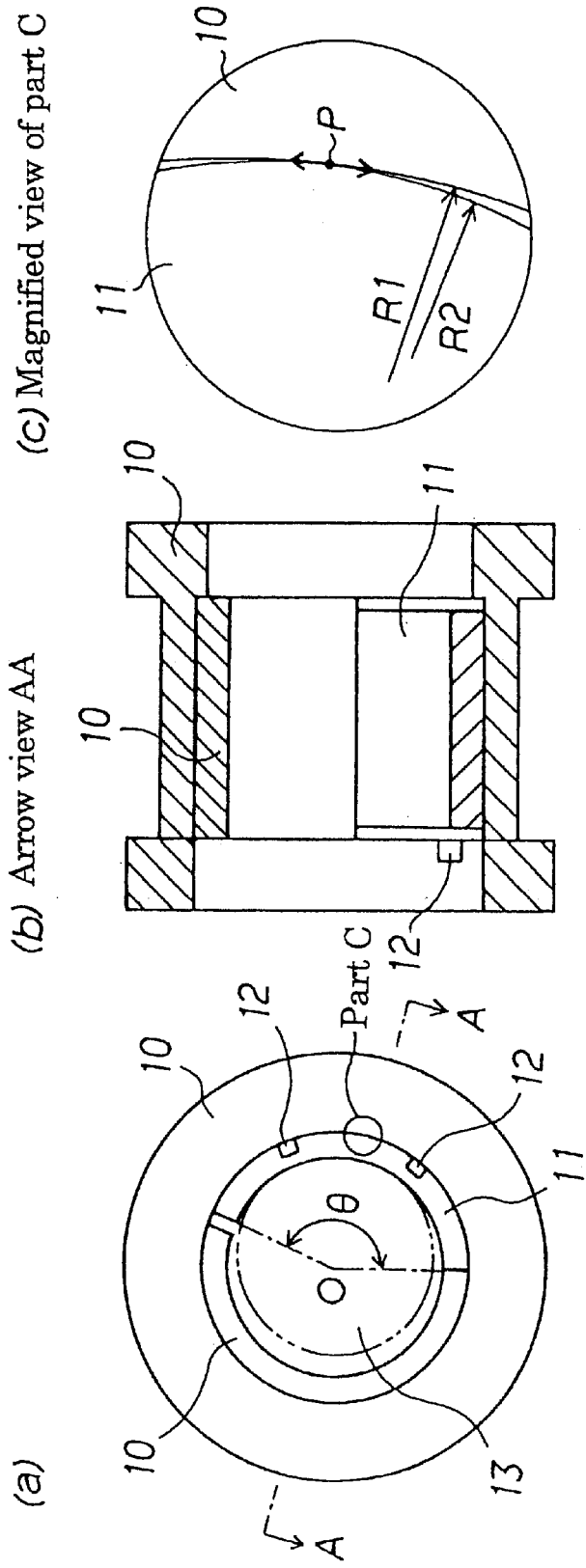
FIG. 1 shows an embodiment of the invention, (a) is a side schematic view, (b) is an arrow view AA of (a), and (c) is a magnified view of part C in (a).

FIG. 1 shows an embodiment of the invention, in which (a) is a side schematic view, (b) is a view of arrow AA in (a), and (c) is a magnified view of part C in (a). As shown in the diagram, the bearing device of the invention comprises a shaft 13, and a bearing 11 composed of a hard ceramic sinter sliding and contacting therewith, being retained by a steel retainer 10. The back side of the bearing 11 (the rear side of the sliding and contacting surface) is not fixed to the inside of the retainer 10, but is displaceable. Reference numeral 12 is a thrust bearing for preventing the bearing 11 from dropping off the retainer 10.

The hard ceramic sinter material as the bearing 11 is preferably a partial cylindrical shape with an effective angle from over 90 degrees to 160 degrees. Herein, the partial cylindrical shape is a divided piece having a hollow cylinder with a finite length in axial direction divided in plural sections in the circumferential direction. The hollow cylinder includes both a cylinder matched in the central axis of external circumference and the central axis of internal circumference, and a cylinder not matched and parallel in both central axes. The effective angle is the viewing angle ($\theta$ in FIG. 1) of seeing the peripheral length range of the partial cylinder from the center of rotation O of the shaft 13. If the effective angle is less than or equal to 90 degrees, depending on the plating operation conditions, the shaft 13 may be separated from the hard ceramic sinter of the bearing 11, and may slide and contact with the steel of the retainer 10, possibly causing vibration of the metal strip 1 or wear of the shaft 13, and stable operation is difficult. On the other hand, if the effective angle is more than 160 degrees, the rigidity to the compressive force from both ends of the bearing 11 in the circumferential direction is lowered, and the bearing 11 is likely to be broken. Hence, the preferred range of effective angle is over 90 degrees to 160 degrees. To further enhance the operation stability, it is preferred to define the effective angle in a range of 100 degrees to 160 degrees.

The radius of curvature of the surface of the bearing 11 sliding and contacting with the shaft is set slightly larger than the radius of curvature of the shaft 13. In order to retain the bearing 11 displaceably by the retainer 10, as shown in FIG. 1(c), the inside of the retainer 10 and the back side of the bearing 11 are preferred to contact with each other in a structure of setting the former radius of curvature R1 larger than the latter radius of curvature R2. In such structure, the back side of the bearing 11 and the inside of the retainer 10 contact with each other by point, and the position of the contact point P can be changed smoothly depending on the external force, so that the compressive force of the residual plating metal acting on the bearing 11 can be evaded effectively.

In this case, the ratio of the radius of curvature of the retainer 10 inside and bearing 11 back side is over 1.0, but referring to the ordinary range of the shaft 13 radius and radius of curvature of the retainer 10 inside, if this ratio is excessive, the radius of curvature of the bearing 11 back side becomes smaller than the shaft 13 ratio, and it is preferred to limit this ratio at 1.5 or less, and or more preferably 1.2 or less from the viewpoint of assuring a bearing 11 wall thickness (about 20 mm) for obtaining a sufficient rigidity.

Figure 2:
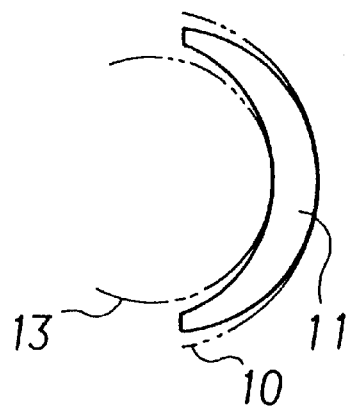
FIG. 2 is a sectional schematic view showing an example of a bearing of a crescent section.
Figure 3:
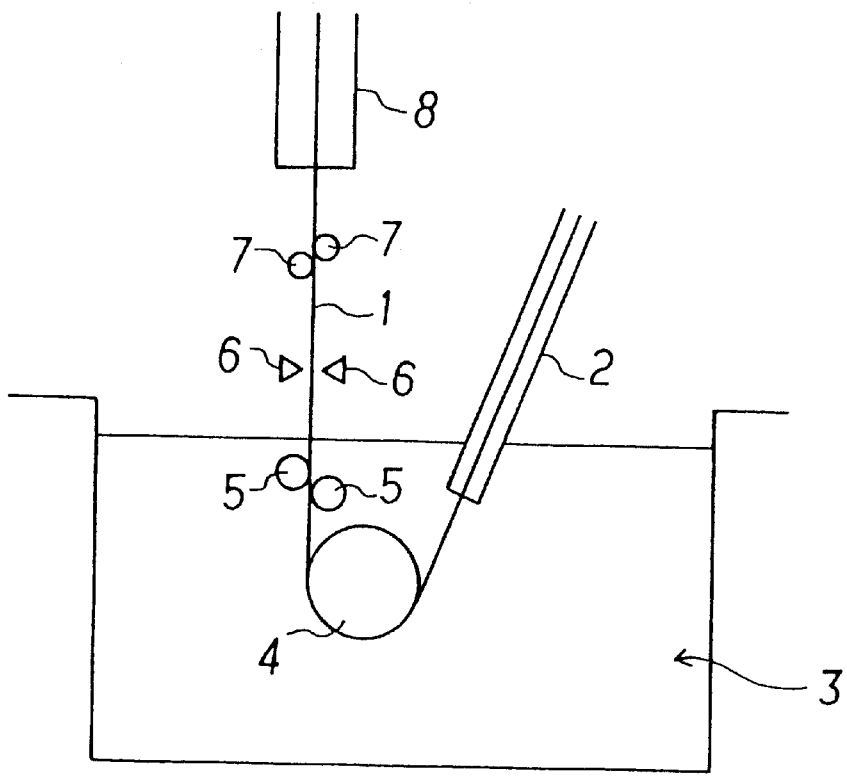
FIG. 3 is a side schematic view showing a general example of continuous molten metal plating process.

The partial cylinder forming the bearing 11 is not required to be uniform in wall thickness in the peripheral direction, and as shown in FIG. 2, for example, a so-called crescent sectional shape may be formed so that the wall thickness may be smaller as going from the center of the peripheral direction toward the end portion.

EXAMPLES

The invention is applied in bath support rolls 5 with the shell diameter of 250 mm and shaft diameter of 80 mm used in continuous molten galvanizing line of steel strip 1. In this plating line, steel strip are passed in a molten galvanizing bath of bath temperature of 450 to 480° C. and bath composition of Zn-0.12 to 0.20%Al. The embodiment is as shown in FIG. 1, the bearing 11 material is sialon ($Si_{6-Z}Al_ZO_ZN_{8-Z}$(z=over 0 to 4.2 or less), the retainer 10 material is SUS316L, the bearing 11 shape is partial cylindrical shape with uniform wall thickness in the peripheral direction, the effective angle $\theta$ is 160 degrees, the radius of curvature R1 of the bearing 11 back side is 60 mm, and the radius of curvature of retainer 10 inside is 63 mm. The support rolls were conventionally supported by a bearing device composed of a fully cylindrical bearing made of sialon sinter fitted and fixed with a retainer made of SUS316L.

The bath support rolls A supported by the bearing device of the invention and bath support rolls B supported by the conventional bearing device were immersed in the molten galvanizing bath and used in manufacture of molten galvanized steel plates for 10 days, and then lifted and the bearing conditions were observed, and breakage was observed in the bearing in the bath support rolls B, but no breakage was noted in the bath support rolls A.

Hitherto, it was broken and not practicable, but by employing the structure of the embodiment of the invention, breakage of bearing 11 due to solidification and shrinkage of residual zinc in the cooling process after lifting the rolls is completely eliminated, and the repair cost is curtail to about 30% of the conventional expense. Besides, the shaft 13 wear rate is lowered to about 10% of the conventional level, and vibration of steel strip 1 due to uneven wear is eliminated and the operation is stabilized, and further the roll replacement frequency is lowered to about 50% of the conventional level, and outstanding effects are obtained.

Industrial Applicability of the Present Invention

According to the invention, durability of the bearing for continuous molten metal plating bath rolls has been remarkably improved, and stability of operation, saving of repair expenses, and reduction of frequency of replacement of rolls or the like are achieved at the same time.

What is claimed is:

1. A sliding bearing device for a continuous molten metal plating bath roll comprising:
    a steel retainer;
    a shaft; and
    a bearing composed of a hard ceramic sinter sliding and contacting with said shaft and retained movably by said retainer,
    wherein said bearing is displaceable as its back side rolls in contact with the inside of said retainer.

2. The bearing device of claim 1, wherein said bearing forms a partial cylindrical shape with an effective angle from over 90 degrees to 160 degrees.

3. The bearing device of claim 2, wherein the radius of curvature of the inside of the retainer is larger than the radius of curvature of the back side of the bearing, and they are brought into contact with each other.

4. The bearing device of claim 3, wherein the ratio of the radius of curvature of the inside and the back side is from over 1.0 to 1.5.

5. The bearing device of claim 1, wherein the radius of curvature of the inside of the retainer is larger than the radius of curvature of the back side of the bearing, and they are brought into contact with each other.

6. The bearing device of claim 5, wherein the ratio of the radius of curvature of the inside and the back side is from over 1.0 to 1.5.

7. A sliding bearing device for a continuous molten metal plating bath roll comprising:
    a steel retainer;
    a shaft; and
    a bearing composed of a hard ceramic sinter sliding and contacting with said shaft and retained movably by said retainer,
    wherein said bearing forms a partial cylindrical shape with an effective angle from over 90 degrees to 160 degrees.

8. The bearing device of claim 7, wherein the radius of curvature of the inside of the retainer is larger than the radius of curvature of the back side of the bearing, and they are brought into contact with each other.

9. The bearing device of claim 8, wherein the ratio of the radius of curvature of the inside and the back side is from over 1.0 to 1.5.

10. A sliding bearing device for a continuous molten metal plating bath roll comprising:
    a steel retainer;
    a shaft; and
    a bearing composed of a hard ceramic sinter sliding and contacting with said shaft and retained movably by said retainer,
    wherein the radius of curvature of the inside of the retainer is larger than the radius of curvature of the back side of the bearing, and they are brought into contact with each other.

11. The bearing device of claim 10 wherein the ratio of the radius of curvature of the inside and the back side is from over 1.0 to 1.5.

* * * * *